United States Patent
Osorio Murillo et al.

(10) Patent No.: US 11,697,742 B2
(45) Date of Patent: Jul. 11, 2023

(54) HIGH OPACITY WHITE INK

(71) Applicant: SUN CHEMICAL CORPORATION, Parsippany, NJ (US)

(72) Inventors: Jarol Alberto Osorio Murillo, Fort Mill, SC (US); Hampton Caudle, Rock Hill, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 330 days.

(21) Appl. No.: 16/954,317

(22) PCT Filed: Dec. 17, 2018

(86) PCT No.: PCT/US2018/065946
§ 371 (c)(1),
(2) Date: Jun. 16, 2020

(87) PCT Pub. No.: WO2019/126006
PCT Pub. Date: Jun. 27, 2019

(65) Prior Publication Data
US 2021/0079237 A1 Mar. 18, 2021

Related U.S. Application Data

(60) Provisional application No. 62/607,630, filed on Dec. 19, 2017.

(51) Int. Cl.
*C09D 11/037* (2014.01)
*B41M 1/10* (2006.01)
*B41M 1/30* (2006.01)
*C09D 11/033* (2014.01)
*C09D 11/102* (2014.01)
*C09D 11/108* (2014.01)

(52) U.S. Cl.
CPC ............ *C09D 11/037* (2013.01); *B41M 1/10* (2013.01); *B41M 1/30* (2013.01); *C09D 11/033* (2013.01); *C09D 11/102* (2013.01); *C09D 11/108* (2013.01)

(58) Field of Classification Search
CPC ... C09D 11/037; C09D 11/033; C09D 11/102; C09D 11/108; B41M 1/10; B41M 1/30
See application file for complete search history.

(56) References Cited

U.S. PATENT DOCUMENTS

| 6,139,961 A | 10/2000 | Blankenship et al. |
| 6,492,435 B1 | 12/2002 | Miyamoto et al. |
| 2006/0046056 A1 | 3/2006 | Brown et al. |
| 2006/0188321 A1 | 8/2006 | Nakamura et al. |
| 2006/0275606 A1 | 12/2006 | Mizutani |
| 2009/0053164 A1* | 2/2009 | Opper-Linnert ...... C09C 1/0015 523/171 |
| 2011/0181646 A1 | 7/2011 | Okuda et al. |
| 2011/0318594 A1 | 12/2011 | Wheeler et al. |
| 2016/0040018 A1 | 2/2016 | Stratton |
| 2017/0290750 A1* | 10/2017 | Hamm .................. C09C 1/0039 |
| 2018/0362782 A1* | 12/2018 | Ogawa ................ C09D 11/102 |

FOREIGN PATENT DOCUMENTS

| CN | 101279233 | 10/2008 |
| CN | 104514179 | 4/2015 |
| EP | 2386609 | 11/2011 |
| EP | 2386610 | 11/2011 |
| WO | WO 2007/141260 | 12/2007 |
| WO | WO 2007/141271 | 12/2007 |
| WO | WO 2011/134907 | 11/2011 |
| WO | WO 2011/134908 | 11/2011 |
| WO | WO 2013/060657 | 5/2013 |
| WO | WO 2015/138117 A | 9/2015 |
| WO | WO 2017/098660 A1 | 6/2017 |

OTHER PUBLICATIONS

International Search Report issued in International Application No. PCT/US2018/065946, dated Mar. 22, 2019.
Written Opinion of the International Searching Authority issued in International Application No. PCT/US2018/065946, dated Mar. 22, 2019.
International Preliminary Report on Patentability (Chapter II of the Patent Cooperation Treaty) issued in International Application No. PCT/US2018/065946, dated Feb. 25, 2020.
Extended European Search Report issued in counterpart EP Application No. 18892708.1, dated Aug. 27, 2021.

* cited by examiner

*Primary Examiner* — Michael M. Robinson
(74) *Attorney, Agent, or Firm* — Marian E. Fundytus; Ostrolenk Faber LLP.

(57) ABSTRACT

The present invention provides solvent-based high opacity inks and coatings. The high opacity inks and coatings comprise one or more binders, $TiO_2$ pigment, polymeric void hollowsphere particles, and one or more organic solvents. The inks and coatings may also include mica-based pigments and aluminum pigments. The high opacity inks and coatings of the invention are suitable for use on packaging wherein a high opacity ink or coating is needed to, for example, hide undesired visual effects, or to protect the packaged goods.

18 Claims, No Drawings

HIGH OPACITY WHITE INK

CROSS REFERENCE TO RELATED APPLICATIONS

The present application is a § 371 National Phase application based on PCT/US2018/065946 filed Dec. 17, 2018, which claims the benefit of U.S. Provisional Application No. 62/607,630, filed Dec. 19, 2017, the subject matter of each of which is incorporated by reference in their entirety.

FIELD OF THE INVENTION

The present invention relates to white ink and coating compositions. The ink and coating compositions provide high opacity when applied to a substrate. The ink and coating compositions are suitable for printing on packaging articles that can be used, for example, for food, cosmetics, etc. The ink and coating compositions are suitable for application by flexographic or gravure printing methods, as well as other methods of application.

BACKGROUND

In the industry of packaging of goods (e.g. foods and beverages, pharmaceuticals, cosmetics, household products, tobacco, industrial, etc.) there is a need for the use of white inks that provide high levels of opacity to hide undesired visual effects, protect the packaged good from exposure to visible light, or provide maximum whiteness for marketing or other commercial reasons. The current state of the art has limitations to how much opacity can be achieved on a printed package, especially via the flexographic printing process, and in some cases the gravure printing process.

EP 2386609, EP 2386610, WO 2011/134907, WO 2011/134908, and WO 2013/060657 disclose aqueous pigmented coating compositions with a high pigment volume, that have a low energy content in that it requires less energy to manufacture the component parts. The pigmented coating compositions contain opacifying pigments comprising $TiO_2$ and optionally hollow polymeric particles, and optionally other non-opacifying extender particles.

U.S. Pat. No. 6,139,961 discloses the preparation of hollow sphere organic pigment particles having a shell/core morphology. The particles can be used in water-borne coating compositions.

US 2006/0046056 describes heat resistant hollow sphere particles having a core stage swollen with a hard or fixed base. The particles are used for heat resistant fabrics, in powder coatings, in a plastic, or to coat metal.

WO 2007/141260 discloses composites of inorganic and/or organic microparticles and calcium carbonate nanoparticles. The surface of the inorganic and/or organic microparticles is coated with the calcium carbonate nanoparticles. WO 2007/141271 discloses composites of inorganic and/or organic microparticles and dolomite nanoparticles. The surface of the inorganic and/or organic microparticles is coated with the dolomite nanoparticles. The composites of each reference can be used in coating compositions to provide improved opacity.

CN 101279233 discloses hollow spheres of acrylate copolymer or styrene polymer having an outer layer coated with titanyl hydrate. These provide titanium oxide hollowspheres that can be used as high color electrophoresis particles.

CN 104514179 discloses a digital paint comprising a polyvinyl alcohol resin, polyvinyl latex, $TiO_2$, nano-silica, a thermoplastic hollow-sphere aqueous dispersion, a cationic fixing agent, antifoaming agent, and water. The compositions do not contain organic solvents.

Although some progress has been made, currently available opaque inks do not provide adequate opacity. Thus, there is still a need to develop opaque inks and coatings with improved opacity.

BRIEF SUMMARY OF THE INVENTION

The present invention is drawn to solvent-based white ink and coating compositions that provide high opacity when applied to substrates. Preferably, the ink and coating compositions comprise one or more binders, titanium dioxide ($TiO_2$) particles, polymeric void spherical particles (hollowspheres), and organic solvents. The ink and coating compositions can also contain other pigments such as $TiO_2$ coated mica particles, and aluminum.

In a particular aspect, the present invention provides a solvent-based white ink or coating composition comprising:
a) one or more binders;
b) titanium dioxide ($TiO_2$) pigment;
c) polymeric void hollowsphere particles; and
d) one or more organic solvents.

In another aspect, the present invention provides a method of coating or printing a substrate with the solvent-based white ink or coating compositions of the present invention.

In some embodiments, the present invention provides substrates comprising the solvent-based white ink or coating compositions of the present invention.

In some embodiments, the present invention provides articles comprising the solvent-based white ink or coating compositions of the present invention.

The inks and coatings of the invention provide improved opacity on printed/coated substrates.

These and other objects, advantages, and features of the invention will become apparent to those persons skilled in the art upon reading the details of the formulations and methods as more fully described below.

DETAILED DESCRIPTION OF THE INVENTION

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

The present invention provides high opacity solvent-based white inks. Other colorants may also be included, in addition to the white pigment. The inks are suitable for use on packaging for food and beverages, pharmaceuticals, cosmetics, household products, tobacco, industrial products, etc. Preferred methods of applying the ink or coating compositions include flexographic and gravure printing processes.

In a particular aspect, the present invention provides a solvent-based white ink or coating composition comprising:
a) one or more binders;
b) titanium dioxide (TiO$_2$) pigment;
c) polymeric void hollowsphere particles; and
d) one or more organic solvents.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, and all narrower ranges within that range, whether specifically recited or not.

As used herein, the terms "opacity" or "contrast ratio opacity" of a pigmented ink or coating refers to its ability to cover the color or color differences of a substrate. Opacity depends on the amount of light that is transmitted through, or reflected from, the surface of the ink. More opaque colorants have a greater tendency to reflect and refract light.

As used herein, the terms "(meth)acrylate," "(meth)acrylic acid," or "acrylate" include both acrylate and methacrylate compounds, and both acrylic acid and methacrylic acid, unless specified otherwise.

As used herein, the term "binder" means polymeric or resinous component that binds to the colorant or pigment. The binder may serve to adhere the pigment to the substrate, or to keep a pigment uniformly dispersed in a fluid ink vehicle. When referring to the amount of binder in a composition, it refers to the weight of the material used, including the actual binder resin and any diluents or other additives present in the form in which it is used (e.g. binder in ethanol), when the recited weight is based on the total weight of the composition. When the amount of binder is recited on a solid weight basis, this refers to the amount of the actual resin (solids), after the other components (e.g. ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

As used herein, the term "polymer" includes both homo- and co-polymers.

As used herein, the terms "polymeric void spherical particles," "hollowsphere particles," and "hollowspheres" are used interchangeably, and refer to polymer spheres that have an outer wall and an inner wall, wherein the inner wall surrounds a void (i.e. air filled space).

As used herein, the terms "solvent-based ink or coating composition(s)," "solvent-based coating compositions(s)," "solvent-based ink composition(s)," "solvent-based coating(s)," "solvent-based ink(s)," "coating(s)," "coating composition(s)," "ink(s)", "ink compositions(s)," "compositions" and the like are used interchangeably. As used herein, coatings and related terms include inks, and vice-versa.

As used herein, "substrate" means any surface or object to which an ink or coating can be applied. Substrates include, but are not limited to, cellulose-based substrates, paper, paperboard, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Ink and Coating Compositions

The present invention provides solvent-based high opacity ink and coating compositions. The ink and coating compositions comprise one or more binders, titanium dioxide (TiO$_2$) white pigment, polymeric void hollowsphere particles, and one or more organic solvents. In some embodiments, other pigments, such as TiO$_2$ coated mica and aluminum, may also be included.

The ink and coating compositions of the present invention typically comprise about 40 wt % to about 70 wt % total non-volatiles (i.e. solids). Preferably, the ink and coating compositions of the present invention comprise about 50 wt % to about 60 wt % total non-volatiles. For example, the ink and coating compositions may comprise about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 70 wt %; or about 50 wt % to about 65 wt %; or about 50 wt % to about 60 wt %; or about 60 wt % to about 70 wt %; or about 60 wt % to about 65 wt %; or about 65 wt % to about 70 wt %, total non-volatiles.

In some embodiments, the compositions comprise one binder. In other embodiments, the compositions comprise two or more different binders. Suitable binders include, but are not limited to, nitrocellulose-based resins, polyester-based resins, polyurethane-based resins, acrylic-based resins, polyamide-based resins, PVB-based resins (polyvinyl butyrate), styrene-based resins, combinations thereof, and the like. Other suitable binders include, but are not limited to, non-aqueous dispersions comprising one or more core-shell polymer-acrylates having core moieties selected from the group consisting of styrene, butyl acrylate, methyl methacrylate, hexyl acrylate, hexyl methacrylate, 2-ethylhexyl acrylate, 2-ethylhexyl methacrylate, acrylic acid, methacrylic acid; and shells comprised of, but not limited to, polyurethane resins, combinations thereof, and the like. A preferred resin is NeoRez U-475 polyurethane solution (DSM). Another preferred resin is UNI-REZ 2215 polyamide (Kraton).

The ink and coating compositions of the present invention typically comprise about 10 wt % to about 30 wt % total binders (i.e. the sum of all binders in the composition), based on the total weight of the ink or coating composition. Preferably, the compositions comprise about 15 wt % to about 25 wt % total binders, based on the total weight of the ink or coating composition. For example, the compositions may comprise about 10 wt % to about 25 wt %; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %, total binders, based on the total weight of the ink or coating composition.

When referring to the amount of binder in a composition, it refers to the weight of the material used, including the actual binder resin and any diluents or other additives present in the form in which it is used (e.g. binder in ethanol), when the recited weight is based on the total weight of the composition. When the amount of binder is recited on a solid weight basis, this refers to the amount of the actual resin (solids), after the other components (e.g. ethanol) are removed. For example, a composition may comprise 30 wt % of binder material which is a 25% solids solution in ethanol, based on the total weight of the composition. The actual binder resin (solids) that is present based on a solid weight basis is 30(0.25)=7.5 wt %.

When more than one binder is used, each individual binder is typically independently present in an amount of about 0.5 wt % to about 25 wt %, based on the total weight of the composition. Preferably, each individual binder is independently present in an amount of about 1 wt % to about 23 wt %, based on the total weight of the composition. For example each individual binder may be present in an amount of about 0.5 wt % to about 20 wt %; or about 0.5 wt % to about 15 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 25 wt %; or about 5 wt % to about 20 wt %; or about 5 wt % to about 15 wt %; or about 5 wt % to about 10 wt %; or about 10 wt % to about 25 wt %; or about 10 wt % to about 20 wt %; or about 10 wt % to about 15 wt %; or about 15 wt % to about 25 wt %; or about 15 wt % to about 20 wt %; or about 20 wt % to about 25 wt %, based on the total weight of the composition.

Binders are often provided as dispersions or solutions. The solids content (i.e. the actual binder) of the binder dispersions or solutions is about 20 wt % to about 50 wt %. For example, the binder dispersions or solutions may have a solids content of about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 50 wt %; or about 30 wt % to about 45 wt %; or about 30 wt % to about 40 wt %; or about 30 wt % to about 35 wt %; or about 35 wt % to about 50 wt %; or about 35 wt % to about 45 wt %; or about 35 wt % to about 40 wt %; or about 40 wt % to about 50 wt %; or about 40 wt % to about 45 wt %; or about 45 wt % to about 50 wt %.

The ink and coating compositions of the present invention generally comprise about 5 wt % to about 10 wt % total binders, on a solid weight basis (i.e. portion of the binder material that is binder resin (solids)). The percent (%) total non-volatiles (solids) content is based on the total solids before dilution (cut) with organic solvents to achieve print viscosity. For example, the ink and coating compositions of the present invention may comprise about 5 wt % to about 8 wt % total binders, on a solid weight basis.

There is no limitation on the type or grade of $TiO_2$ pigment used in the ink and coating compositions of the present invention, as long as the $TiO_2$ pigment is suitable for use in a printing ink composition. The examples of the present invention use Ti-Pure R-931 $TiO_2$ pigment (Chemours), but any suitable $TiO_2$ pigment could be used.

Advantageously, the ink and coating compositions of the invention comprise titanium dioxide ($TiO_2$) as a white pigment. The ink and coating compositions of the present invention typically comprise about 30 wt % to about 60 wt % $TiO_2$, based on the total weight of the composition. Preferably, the ink and coating compositions of the invention comprise about 35 wt % to about 40 wt % $TiO_2$, based on the total weight of the composition. For example, the ink and coating compositions may comprise $TiO_2$ pigment in an amount of about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 60 wt %; or about 40 wt % to about 55 wt %; or about 40 wt % to about 50 wt %; or about 40 wt % to about 45 wt %; or about 45 wt % to about 60 wt %; or about 45 wt % to about 55 wt %; or about 45 wt % to about 50 wt %; or about 50 wt % to about 60 wt %; or about 50 wt % to about 55 wt %; or about 55 wt % to about 60 wt %, based on the total weight of the composition.

The $TiO_2$ pigment is generally present in an amount of about 30 wt % to about 60 wt % of the total non-volatile (i.e. solids), on a solid weight basis. Preferably, the $TiO_2$ pigment is present in an amount of about 35 wt % to about 40 wt %, on a solid weight basis. For example, the ink and coating compositions may comprise $TiO_2$ pigment in an amount of about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 60 wt %; or about 40 wt % to about 55 wt %; or about 40 wt % to about 50 wt %; or about 40 wt % to about 45 wt %; or about 45 wt % to about 60 wt %; or about 45 wt % to about 55 wt %; or about 45 wt % to about 50 wt %; or about 50 wt % to about 60 wt %; or about 50 wt % to about 55 wt %; or about 55 wt % to about 60 wt %, on a solid weight basis.

The $TiO_2$ pigment to binder ratio is generally about 2:1 to about 10:1, on a solid weight basis. Preferably the $TiO_2$ to binder ratio is about 4:1 to about 6:1, on a solid weight basis. For the purposes of this ratio, "binder" refers to the sum of all of the binders in the composition. For example, the $TiO_2$ pigment to binder ratio may be about 2:1 to about 8:1; or about 2:1 to about 6:1; or about 4:1 to about 10:1; or about 4:1 to about 8:1; or about 4:1 to about 6:1; or about 6:1 to about 10:1; or about 6:1 to about 8:1; or about 8:1 to about 10:1.

The polymeric void spherical particles, or hollowspheres or hollowsphere particles, preferably consist of polymeric resins comprising styrene-acrylate copolymers, and have a hollowsphere morphology with an external diameter ranging from about 0.2 μm to about 0.5 μm. The hollow particles scatter more light than solid particles, increasing the opacity of the ink or coating composition. By including the polymeric hollowspheres, it is possible to achieve a high level of opacity even when lower levels of white pigments, such as $TiO_2$, are used. Although the type of polymeric void spherical particles is not limited, a preferred material is Sun-Spheres Powder (Dow), which are described for use in personal care products (especially sunscreen lotion), but not for use in inks and coatings that are intended for printed packaging applications.

The ink and coating compositions of the present invention typically comprise about 0.5 wt % to about 6 wt % polymeric hollowspheres, based on the total weight of the composition. Preferably, the ink and coating compositions of the present invention comprise about 1 wt % to about 5 wt % polymeric hollowspheres, and more preferably about 2 wt % to about 4 wt %, based on the total weight of the composition. For example, the polymeric hollowspheres may be present in an amount of about 0.5 wt % to about 5.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 6 wt %; or about 1 wt % to about 5.5 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %; or about 1.5 wt % to about 6 wt %; or about 1.5 wt % to about 5.5 wt %; or about 1.5 wt % to about 5 wt %; or about 1.5 wt % to about 4.5 wt %; or about 1.5 wt % to about 4 wt %; or about 1.5 wt % to about 3.5 wt %; or about 1.5 wt % to about 3 wt %; or about 1.5 wt % to about 2.5 wt %; or about 1.5 wt % to about 2 wt %; or about 2 wt % to about 6 wt %; or about 2 wt % to about 5.5 wt %; or about 2 wt % to about 5 wt %; or about 2 wt % to about 4.5 wt %; or about 2 wt % to about 4 wt %; or about 2 wt % to about 3.5 wt %; or about 2 wt % to about 3 wt %; or about 2 wt % to about 2.5 wt %; or about 2.5 wt % to about 6 wt %; or about 2.5 wt % to about 5.5 wt %; or about 2.5 wt % to about 5 wt %; or about 2.5 wt % to about 4.5 wt %; or about 2.5 wt % to about 4 wt %; or about 2.5 wt % to about 3.5 wt %; or about 2.5 wt % to about 3 wt %; or about 3 wt % to about 6 wt %; or about 3 wt % to about 5.5 wt %; or about 3 wt % to about 5 wt %; or about 3 wt % to about 4.5 wt %; or about 3 wt % to about 4 wt %; or about 3 wt % to about 3.5 wt %; or about 3.5 wt % to about 6 wt %; or about 3.5 wt % to about 5.5 wt %; or about 3.5 wt % to about 5 wt %; or about 3.5 wt % to about 4.5 wt %; or about 3.5 wt % to about 4 wt %; or about 4 wt % to about 6 wt %; or about 4 wt % to about 5.5 wt %; or about 4 wt % to about 5 wt %; or about 4 wt % to about 4.5 wt %; or about 4.5 wt % to about 6 wt %; or about 4.5 wt % to about 5.5 wt %; or about 4.5 wt % to about 5 wt %; or about 5 wt % to about 6 wt %; or about 5 wt % to about 5.5 wt %; or about 5.5 wt % to about 6 wt %, based on the total weight of the composition.

The ink and coating compositions of the present invention typically comprise about 0.5 wt % to about 6 wt % polymeric hollowspheres, on a solid weight basis. Preferably, the ink and coating compositions of the present invention comprise about 1 wt % to about 5 wt % polymeric hollowspheres, and more preferably about 2 wt % to about 4 wt %, on a solid weight basis. For example, the polymeric hollowspheres may be present in an amount of about 0.5 wt % to about 5.5 wt %; or about 0.5 wt % to about 5 wt %; or about 0.5 wt % to about 4.5 wt %; or about 0.5 wt % to about 4 wt %; or about 0.5 wt % to about 3.5 wt %; or about 0.5 wt % to about 3 wt %; or about 0.5 wt % to about 2.5 wt %; or about 0.5 wt % to about 2 wt %; or about 0.5 wt % to about 1.5 wt %; or about 0.5 wt % to about 1 wt %; or about 1 wt % to about 6 wt %; or about 1 wt % to about 5.5 wt %; or about 1 wt % to about 5 wt %; or about 1 wt % to about 4.5 wt %; or about 1 wt % to about 4 wt %; or about 1 wt % to about 3.5 wt %; or about 1 wt % to about 3 wt %; or about 1 wt % to about 2.5 wt %; or about 1 wt % to about 2 wt %; or about 1 wt % to about 1.5 wt %; or about 1.5 wt % to about 6 wt %; or about 1.5 wt % to about 5.5 wt %; or about 1.5 wt % to about 5 wt %; or about 1.5 wt % to about 4.5 wt %; or about 1.5 wt % to about 4 wt %; or about 1.5 wt % to about 3.5 wt %; or about 1.5 wt % to about 3 wt %; or about 1.5 wt % to about 2.5 wt %; or about 1.5 wt % to about 2 wt %; or about 2 wt % to about 6 wt %; or about 2 wt % to about 5.5 wt %; or about 2 wt % to about 5 wt %; or about 2 wt % to about 4.5 wt %; or about 2 wt % to about 4 wt %; or about 2 wt % to about 3.5 wt %; or about 2 wt % to about 3 wt %; or about 2 wt % to about 2.5 wt %; or about 2.5 wt % to about 6 wt %; or about 2.5 wt % to about 5.5 wt %; or about 2.5 wt % to about 5 wt %; or about 2.5 wt % to about 4.5 wt %; or about 2.5 wt % to about 4 wt %; or about 2.5 wt % to about 3.5 wt %; or about 2.5 wt % to about 3 wt %; or about 3 wt % to about 6 wt %; or about 3 wt % to about 5.5 wt %; or about 3 wt % to about 5 wt %; or about 3 wt % to about 4.5 wt %; or about 3 wt % to about 4 wt %; or about 3 wt % to about 3.5 wt %; or about 3.5 wt % to about 6 wt %; or about 3.5 wt % to about 5.5 wt %; or about 3.5 wt % to about 5 wt %; or about 3.5 wt % to about 4.5 wt %; or about 3.5 wt % to about 4 wt %; or about 4 wt % to about 6 wt %; or about 4 wt % to about 5.5 wt %; or about 4 wt % to about 5 wt %; or about 4 wt % to about 4.5 wt %; or about 4.5 wt % to about 6 wt %; or about 4.5 wt % to about 5.5 wt %; or about 4.5 wt % to about 5 wt %; or about 5 wt % to about 6 wt %; or about 5 wt % to about 5.5 wt %; or about 5.5 wt % to about 6 wt %, on a solid weight basis.

The hollowsphere to $TiO_2$ pigment ratio is typically about 0.01:1 to about 0.5:1, on a solid weight basis. Preferably, the hollowsphere to $TiO_2$ pigment ratio is about 0.05:1 to about 0.15:1. For example, the hollowsphere to $TiO_2$ pigment ratio may be about 0.01:1 to about 0.05:1; or about 0.01:1 to about 0.1:1; or about 0.01:1 to about 0.01:1 to about 0.05:1; or about 0.01:1 to about 0.1:1; or about 0.01:1 to about 0.15:1; or about 0.05:1 to about 0.5:1; or about 0.05:1 to about 0.1:1; or about 0.05:1 to about 0.15:1.

Suitable organic solvents include, but are not limited to, aliphatic alcohols, esters, glycol ethers, glycol ether acetates, aliphatic alcohols, combinations thereof, and the like.

The ink and coating compositions typically comprise about 20 wt % to about 60 wt % one or more organic solvents. Preferably, the compositions comprise about 20 wt % to about 40 wt %, and more preferably about 30 wt % to about 40 wt % organic solvents, based on the total weight of the composition. For example, the organic solvents may be present in an amount of about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 60 wt %; or about 40 wt % to about 55 wt %; or about 40 wt % to about 50 wt %; or about 40 wt % to about 45 wt %; or about 45 wt % to about 60 wt %; or about 45 wt % to about 55 wt %; or about 45 wt % to about 50 wt %; or about 50 wt % to about 60 wt %; or about 50 wt % to about 55 wt %; or about 55 wt % to about 60 wt %, based on the total weight of the composition.

In some embodiments, the ink and coating compositions of the invention further comprise one or more mica mineral-based pigments. Preferably, the mica mineral-based pigment is a mica coated with $TiO_2$, or with both $TiO_2$ and SnO (tin oxide). The particle size of the mica-based mineral is preferably about 1 μm to about 15 μm. Although the type of mica-based mineral pigment is not limited, a preferred material is Iriodin® 6111 Icy White Pristine KU26 (Merck). Many other grades and types would also be suitable.

When present, the mica-based pigment is typically present in the ink and coating compositions of the present invention in an amount of about 1 wt % to about 20 wt %, based on the total weight of the composition. Preferably, the mica-based pigment is present in an amount of about 5 wt % to about 10 wt %, based on the total weight of the composition. For example, the mica-based pigment may be present in an amount of about 1 wt % to about 15 wt %; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %, based on the total weight of the composition.

When present, the mica-based pigment is typically present in the compositions of the present invention in an amount of about 1 wt % to about 20 wt %, on a solid weight basis. Preferably, the mica-based pigment is present in an amount of about 5 wt % to about 10 wt %, on a solid weight basis. For example, the mica-based pigment may be present in an amount of about 1 wt % to about 15 wt %; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %, on a solid weight basis.

In some embodiments, the ink and coating compositions of the present invention further comprise one or more aluminum pigments. Many grades of aluminum pigment are suitable. One preferred material is Sparkle Brite 006 NL-PA (Silberline).

When present, the aluminum pigment is typically present in the ink and coating compositions of the present invention in an amount of about 0.05 wt % to about 2 wt %, based on the total weight of the composition. Preferably, the aluminum pigment is present in an amount of about 0.1 wt % to about 1 wt %, or about 0.5 wt % to about 1 wt %, based on the total weight of the composition. For example, the aluminum pigment may be present in an amount of about 0.05 wt % to about 1.5 wt %; or about 0.05 wt % to about 1 wt %; or about 0.05 wt % to about 0.5 wt %; or about 0.05 wt % to about 0.1 wt %; or about 0.1 wt % to about 2 wt %; or about 0.1 wt % to about 1.5 wt %, or about 0.1 wt % to about 1 wt %; or about 0.1 wt % to about 0.5 wt %; or about 0.5 wt % to about 2 wt %; or about 0.5 wt % to about 1.5 wt %; or about 0.5 wt % to about 1 wt %; or about 1 wt % to about 2 wt %; or about 1 wt % to about 1.5 wt %; or about 1.5 wt % to about 2 wt %, based on the total weight of the composition.

When present, the aluminum pigment is typically present in the ink and coating compositions of the present invention in an amount of about 0.05 wt % to about 2 wt %, on a solid weight basis. Preferably, the aluminum pigment is present in an amount of about 0.1 wt % to about 1 wt %, or about 0.5 wt % to about 1 wt %, on a solid weight basis. For example, the aluminum pigment may be present in an amount of about 0.05 wt % to about 1.5 wt %; or about 0.05 wt % to about 1 wt %; or about 0.05 wt % to about 0.5 wt %; or about 0.05 wt % to about 0.1 wt %; or about 0.1 wt % to about 2 wt %; or about 0.1 wt % to about 1.5 wt %, or about 0.1 wt % to about 1 wt %; or about 0.1 wt % to about 0.5 wt %; or about 0.5 wt % to about 2 wt %; or about 0.5 wt % to about 1.5 wt %; or about 0.5 wt % to about 1 wt %; or about 1 wt % to about 2 wt %; or about 1 wt % to about 1.5 wt %; or about 1.5 wt % to about 2 wt %, on a solid weight basis.

The ratio of total non-binder solids (i.e. sum of $TiO_2$, hollowspheres, mica-based pigment, and/or aluminum pigment) to total binder solids in the ink and coating compositions of the present invention is about 5:1 to about 15:1, on a solid weight basis. Preferably, the ratio of total non-binder solids to total binder solids is about 6:1 to about 10:1. For example, the ratio of total non-binder solids to total binder solids in the ink and coating compositions may be about 5:1 to about 10:1; or about 5:1 to about 8:1; or about 5:1 to about 6:1; or about 6:1 to about 15:1; or about 6:1 to about 10:1; or about 6:1 to about 8:1; or about 8:1 to about 15:1; or about 8:1 to about 10:1; or about 10:1 to about 15:1.

The inks and coatings of the present invention are preferably white inks and coatings, but in some embodiments the compositions may also comprise other colorants, in addition to the $TiO_2$ pigment. Adding other colorants would provide opaque inks that could be virtually any color.

Suitable colorants include, but are not limited to, organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

When present, the ink and coating compositions of the present invention typically comprise about 0.1 wt % to about 2 wt % colorants, based on the total weight of the composition. Preferably, the colorants would be present in an amount of about 0.1 wt % to about 1 wt %, based on the total weight of the composition.

As with most ink and coating compositions, additives may be incorporated to enhance various properties. A partial list of such additives includes but is not limited to adhesion promoters, silicones, light stabilizers, de-gassing additives, waxes, ammonia, flow promoters, defoamers, antioxidants, stabilizers, surfactants, dispersants, plasticizers, rheological additives, waxes, silicones, etc. When present, additives are preferably each independently present in an amount of about 0.1 wt % to about 3 wt %, based on the total weight of the composition.

The printing ink may also include waxes, such as, but not limited to, amide wax, erucamide wax, polypropylene wax, paraffin wax, polyethylene wax, teflon, carnauba wax and the like, including micronized wax. The wax may be a combination of said waxes. It is preferred that the wax be a blend of amide and erucamide waxes. Preferably, when included, the waxes are present in an amount of about 0.5 wt % to about 4 wt %, based on the total weight of the composition.

When applied to a substrate and dried, the inks and coatings of the present invention provide a contrast ratio opacity of at least 60%. Preferably, the contrast ratio opacity is at least 70%. Preferably, the contrast ratio opacity is at least 65% when a single layer of the composition of the invention is applied to a substrate; at least 70% when two layers are applied; and at least 80% when three layers are applied.

EXAMPLES

The following examples illustrate specific aspects of the present invention and are not intended to limit the scope thereof in any respect, and should not be so construed.

Methods

Preparation of Ink and Coating Compositions

The ink and coating compositions were prepared according to the formulations shown in the following examples.
Application of Ink and Coating Compositions The ink and coating compositions were applied using a Harper HD Phantom bladed proofer with 200 lpi/9.0 BCM anilox on corona treated polyethylene film. One, two, or three hits (i.e. layers) of the ink or coating were applied, as indicated in the tables below. Prior to application, the ink and coating compositions were adjusted to print viscosity by addition of appropriate amounts of organic solvents (i.e. cut). After application, the ink and coating compositions were dried to produce a coating on the substrate, and tested.
Viscosity Viscosity was measured using a #2 EZ Zahn efflux cup (Zahn). Viscosity is reported as Zahn number, which is the time in seconds for a volume of 100 ml to flow through the orifice.
Opacity Opacity was measured using an X-Rite spectrophotometer. The results are reported as contrast ratio opacity.

Comparative Example 1 (C1). Opaque White Ink Without Hollowspheres

Comparative Example C1 was prepared according to the formulation in Table 1.

TABLE 1

| Formulation of Example C1 | |
|---|---|
| Material | wt % |
| Polyurethane Polymer Solution 31.5% solids in n-propanol/n-acetate 1:1 | 21.4 |
| Propylene Glycol Monomethyl Ether Acetate | 8.8 |
| Propylene Glycol n-Propyl Ether | 9.8 |
| Mowital B20H PVB resin solution 25% solids in ethanol | 1.5 |
| Ti-Pure R-931 $TiO_2$ pigment | 49.7 |
| 4-hydroxy-4-methyl, 2-Pentanone | 8.8 |
| Total | 100.0 |

The % non-volatiles (i.e. solids) of the undiluted composition C1 is shown in Table 2.

TABLE 2

| % Non-volatiles (solids) of Example C1 before dilution | |
|---|---|
| Total (% TNV) (wt %) | 57.244 |
| Polyurethane (wt %) | 7.169 |
| Polyvinyl butyral (wt %) | 0.375 |
| $TiO_2$ (wt %) | 49.7 |
| $TiO_2$: (PU + PVB) ratio | 6.59:1 |

Prior to printing, C1 was cut (diluted) 10% by adding an appropriate amount of an 80:20 blend of n-propanol:n-propyl acetate. After cut, the total solids was 52.04 wt %, and the amount of $TiO_2$ pigment was 45.2 wt %. The print viscosity was 25.6 (Zahn number).

Example 1. Opaque White Ink with Hollowspheres, $TiO_2$ Coated Mica, and Aluminum An opaque white ink of the invention (Ex. 1) was prepared according to the formulation in Table 3. In addition to the polyurethane and PVB binders, $TiO_2$ pigment, and solvents, Ex. 1 ink also contained hollowspheres, $TiO_2$ coated mica, and aluminum pigment.

TABLE 3

| Formulation of Ex. 1 | |
|---|---|
| Material | wt % |
| Polyurethane Polymer Solution 31.5% solids in n-propanol/n-acetate 1:1 | 17.8 |
| Propylene Glycol Monomethyl Ether Acetate | 5.3 |
| Propylene Glycol n-Propyl Ether | 8.2 |
| Mowital B20H PVB resin solution 25% solids in ethanol | 1.3 |
| Ti-Pure R-931 $TiO_2$ pigment | 37.3 |
| 4-hydroxy-4-methyl, 2-Pentanone | 5.3 |
| Polymeric hollowspheres (SunSpheres Powder) | 3.3 |
| Iriodin 6111 $TiO_2$ coated mica pigment | 8.3 |
| Sparkle Brite 006 NL-PA Aluminum based pigment | 0.8 |
| N-Propyl Alcohol | 9.9 |
| N-Propyl Acetate | 2.5 |
| Total | 100.0 |

The % non-volatiles (i.e. solids) of the undiluted composition Ex. 1 is shown in Table 4.

TABLE 4

| % Non-volatiles (solids) of Ex. 1 before dilution | |
| --- | --- |
| Total (% TNV) (wt %) | 55.748 |
| Polyurethane (wt %) | 5.963 |
| Polyvinyl butyral (wt %) | 0.325 |
| $TiO_2$ (wt %) | 37.300 |
| Hollowspheres (wt %) | 3.300 |
| ($TiO_2$ + hollowspheres + mica + aluminum):(PU + PVB) ratio | 7.90:1 |
| Hollowspheres:$TiO_2$ ratio | 0.09:1 |
| $TiO_2$:(PU + PVB) ratio | 5.93:1 |

Prior to printing, Ex. 1 was cut (diluted) 20% by adding an appropriate amount of an 80:20 blend of n-propanol:n-propyl acetate. After cut, the total solids was 55.75 wt %, and the amount of $TiO_2$ pigment was 31.08 wt %. The print viscosity was 27.6 (Zahn number).

Example 2. Opaque White Ink with Hollowspheres

An opaque white ink of the invention (Ex. 2) was prepared according to the formulation in Table 5. In addition to the polyurethane and PVB binders, $TiO_2$ pigment, and solvents, Ex. 2 ink also contained hollowspheres (but no $TiO_2$ coated mica or aluminum).

TABLE 5

| Formulation of Ex. 2 | |
| --- | --- |
| Material | wt % |
| Polyurethane Polymer Solution 31.5% solids in n-propanol/n-acetate 1:1 | 21.4 |
| Propylene Glycol Monomethyl Ether Acetate | 6.3 |
| Propylene Glycol n-Propyl Ether | 9.8 |
| Mowital B20H PVB resin solution 25% solids in ethanol | 1.5 |
| Ti-Pure R-931 $TiO_2$ pigment | 49.7 |
| 4-hydroxy-4-methyl, 2-Pentanone | 6.3 |
| Polymeric hollowspheres (SunSpheres Powder) | 5.0 |
| Total | 100.0 |

The % non-volatiles (i.e. solids) of the undiluted composition Ex. 2 is shown in Table 6.

TABLE 6

| % Non-volatiles (solids) of Ex. 2 before dilution | |
| --- | --- |
| Total (% TNV) (wt %) | 62.244 |
| Polyurethane (wt %) | 7.169 |
| Polyvinyl butyral (wt %) | 0.375 |
| $TiO_2$ (wt %) | 49.700 |
| Hollowspheres (wt %) | 5.000 |
| ($TiO_2$ + hollowspheres):(PU + PVB) ratio | 7.25:1 |
| Hollowspheres:$TiO_2$ ratio | 0.1:1 |
| $TiO_2$:(PU + PVB) ratio | 6.59:1 |

Prior to printing, Ex. 2 was cut (diluted) 30% by adding an appropriate amount of an 80:20 blend of n-propanol:n-propyl acetate. After cut, the total solids was 47.88 wt %, and the amount of $TiO_2$ pigment was 38.2 wt %. The print viscosity was 26.2 (Zahn number).

Example 3. Opaque White Ink with Hollowspheres

An opaque white ink of the invention (Ex. 3) was prepared according to the formulation in Table 7. In addition to the polyurethane and PVB binders, $TiO_2$ pigment, and solvents, Ex. 3 ink also contained hollowspheres.

TABLE 7

| Formulation of Ex. 3 | |
| --- | --- |
| Material | wt % |
| Polyurethane Polymer Solution 31.5% solids in n-propanol/n-acetate 1:1 | 18.6 |
| Propylene Glycol Monomethyl Ether Acetate | 5.5 |
| Propylene Glycol n-Propyl Ether | 8.5 |
| Mowital B20H PVB resin solution 25% solids in ethanol | 1.3 |
| Ti-Pure R-931 $TiO_2$ pigment | 43.2 |
| 4-hydroxy-4-methyl, 2-Pentanone | 5.5 |
| Polymeric hollowspheres (SunSpheres Powder) | 4.3 |
| N-Propyl Alcohol | 10.5 |
| N-Propyl Acetate | 2.6 |
| Total | 100.0 |

The % non-volatiles (i.e. solids) of the undiluted composition Ex. 3 is shown in Table 8.

TABLE 8

| % Non-volatiles (solids) of Ex. 3 before dilution | |
| --- | --- |
| Total (% TNV) (wt %) | 54.056 |
| Polyurethane (wt %) | 6.231 |
| Polyvinyl butyral (wt %) | 0.325 |
| $TiO_2$ (wt %) | 43.2 |
| Hollowspheres (wt %) | 4.3 |
| ($TiO_2$ + hollowspheres):(PU + PVB) ratio | 7.25:1 |
| Hollowspheres:$TiO_2$ ratio | 0.1:1 |
| $TiO_2$:(PU + PVB) ratio | 6.59:1 |

Prior to printing, Ex. 3 was cut (diluted) 22% by adding an appropriate amount of an 80:20 blend of n-propanol:n-propyl acetate. After cut, the total solids was 44.31 wt %, and the amount of $TiO_2$ pigment was 35.4 wt %. The print viscosity was 26.5 (Zahn number).

Example 4. Opaque White Ink with Hollowspheres, $TiO_2$ Coated Mica, Aluminum Pigment, and Polyamide Resin An opaque white ink of the invention (Ex. 4) was prepared according to the formulation in Table 9. Instead of the polyurethane and PVB binders, Ex. 4 contained a polyamide resin. Ex. 4 ink also contained $TiO_2$ pigment, solvents, hollowspheres, $TiO_2$ coated mica, and aluminum pigment.

TABLE 9

| Formulation of Ex. 4 | |
| --- | --- |
| Material | wt % |
| UNI-REZ 2215 Polyamide resin solution 50% solids in n-Propanol | 12.6 |
| Propylene Glycol Monomethyl Ether Acetate | 7.1 |
| Propylene Glycol n-Propyl Ether | 11.1 |
| Ti-Pure R-931 $TiO_2$ pigment | 37.3 |
| 4-hydroxy-4-methyl, 2-Pentanone | 7.1 |
| Polymeric hollowspheres (SunSpheres Powder) | 1.0 |
| Iriodin 6111 $TiO_2$ coated mica based pigment | 9.4 |
| Sparkle Brite 006 NL-PA Aluminum based Pigment | 0.9 |
| N-Propyl Alcohol | 10.8 |
| N-Propyl Acetate | 2.7 |
| Total | 100.0 |

The % non-volatiles (i.e. solids) of the undiluted composition Ex. 4 is shown in Table 10.

TABLE 10

| % Non-volatiles (solids) of Ex. 4 before dilution | |
|---|---|
| Total (% TNV) (wt %) | 54.63 |
| Polyamide (wt %) | 6.30 |
| $TiO_2$ (wt %) | 37.30 |
| Hollowspheres (wt %) | 1.00 |
| ($TiO_2$ + hollowshperes + mica + aluminum):polyamide ratio | 7.71:1 |
| Hollowspheres:$TiO_2$ ratio | 0.03:1 |
| $TiO_2$:polyamide ratio | 5.92:1 |

Ex. 4 was not diluted, therefore the total solids was 54.63 wt %, and the amount of $TiO_2$ was 37.3 wt %. The print viscosity was 26.7 (Zahn number).

Example 5. Opaque White Ink with Hollowspheres, $TiO_2$ Coated Mica, Aluminum Pigment, Polyurethane Resin, Plasticizer, Adhesion Promoter, and Wax An opaque white ink (Ex. 5) was prepared according to the formulation in Table 11. Ex. 5 ink contained polyurethane and PVB resins, $TiO_2$ pigment, solvents, $TiO_2$ coated mica, aluminum pigment, plasticizer, adhesion promoter, and wax.

TABLE 11

| Formulation of Ex. 5 | |
|---|---|
| Material | wt % |
| NeoRez U-475 Polyurethane Polymer Solution 55% solids in ethyl acetate/ethanol | 9.6 |
| Propylene Glycol Monomethyl Ether Acetate | 4.9 |
| Propylene Glycol n-Propyl Ether | 7.6 |
| Mowital B20H PVB resin solution 25% solids in ethanol | 1.2 |
| Ti-Pure R-931 $TiO_2$ pigment | 34.5 |
| 4-hydroxy-4-methyl, 2-Pentanone | 4.9 |
| Micronized Wax (Munzing Chemie) | 2.3 |
| Polymeric hollowspheres (SunSpheres Powder) | 3.1 |
| Iriodin 6111 $TiO_2$ coated mica based pigment | 7.7 |
| Sparkle Brite 006 NL-PA Aluminum based Pigment | 0.7 |
| Plasticizer #8 (Rit-Chem Co) | 1.5 |
| N-Propyl Alcohol | 15.7 |
| N-Propyl Acetate | 3.9 |
| Titanium based adhesion promoter additive | 2.4 |
| Total | 100.0 |

The % non-volatiles (i.e. solids) of the undiluted composition Ex. 5 is shown in Table 12.

TABLE 12

| % Non-volatiles (solids) of Ex. 5 before dilution | |
|---|---|
| Total (% TNV) (wt %) | 56.800 |
| Polyurethane (wt %) | 5.376 |
| Polyvinyl butyral (wt %) | 0.300 |
| $TiO_2$ (wt %) | 34.500 |
| Hollowspheres (wt %) | 3.100 |
| ($TiO_2$ + hollowspheres + mica + aluminum):(PU + PVB) ratio | 8.1:1 |
| Hollowspheres:$TiO_2$ ratio | 0.10:1 |
| $TiO_2$:(PU + PVB) ratio | 6.08:1 |

Prior to printing, Ex. 5 was cut (diluted) 10% by adding an appropriate amount of an 80:20 blend of n-propanol:n-propyl acetate. After cut, the total solids was 51.6 wt %, and the amount of $TiO_2$ pigment was 31.4 wt %. The print viscosity was 25.0 (Zahn number).

Example 6. Testing of Opaque White Inks

Comparative Ex. 1, and Inventive Ex. 1 to 5 were printed and tested as described above. The contrast ratio opacity of one (1 hit), two (2 hits), or three (3 hits) layers is shown in Table 13.

TABLE 13

| | Contrast Ratio Opacity | | | | | |
|---|---|---|---|---|---|---|
| # hits | Ex. C1 | Inv. Ex. 1 | Inv. Ex. 2 | Inv. Ex. 3 | Inv. Ex. 4 | Inv. Ex. 5 |
| 1 | 58.2 | 68.5 | 62.8 | 65.2 | 71.4 | 69.4 |
| 2 | 66.5 | 80.6 | 73.3 | 79.8 | 81.1 | 85.5 |
| 3 | 70.9 | 95.6 | 80.4 | 85.8 | 97.6 | 95.8 |

Inventive Ex. 1 exhibits higher opacity than comparative Ex. C1, due to the addition of hollowspheres, even at a lower % of $TiO_2$. Inventive Ex. 1 also exhibits higher opacity than Inventive Ex. 2, due to the addition of $TiO_2$ coated mica and aluminum pigment, even though inventive Ex. 1 has a lower % of $TiO_2$ than inventive Ex. 2.

Inventive Ex. 3 shows that an addition of hollowspheres provides a significant increase in opacity versus comparative Ex. C1. Inventive Ex. 3 also exhibits higher opacity than inventive Ex. 2, even though inventive Ex. 3 contains a lower % of $TiO_2$ and hollowspheres, and inventive Ex. 3 has no mica or aluminum. This is due to viscosity reduction. Since inventive Ex. 3 has a lower % of resin, $TiO_2$, and hollowspheres than inventive Ex. 2, this results in a lower initial viscosity that requires less solvent dilution prior to printing and therefore yields higher opacity.

Inventive Ex. 4 shows higher opacity than inventive Ex. 1. This is due to the polyamide having better wetting and dispersion properties than the resins used in inventive Ex. 1. The better wetting and dispersion properties yield a lower viscosity printing ink that does not require any viscosity reduction (solvent cut) prior to printing.

Inventive Ex. 5 yields similar opacity data to other inventive examples, however, the specific choice of polyurethane resin yields improved resistance properties. For example, inventive Ex. 5 has improved mechanical abuse (e.g. scuff and rub) resistance, as well as heat resistance properties.

In a further test, inventive Ex. 1 was compared to Sigmatherm White (a commercial opaque white ink from Sun Chemical). Prints with 3 hits were made using 200 lpi/9.0 BCM anilox on corona treated polyethylene film. Inventive Ex. 1 exhibited an opacity of 95.6% versus 63.7% for Sigmatherm White.

In a further test, inventive Ex. 1 was compared to CRWFS1115184 (a commercial opaque white ink from Sun Chemical). Prints with 1 hit were made using 200 lpi/9.0 BCM anilox on corona treated polyethylene film. Opacity was not measured, but the inventive Ex. 1 exhibited a much higher opacity when compared visually.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A solvent-based white ink or coating composition comprising:
   a) 10 wt % to 30 wt % one or more binders, based on the total weight of the ink or coating composition;
   b) 30 wt % to 60 wt % titanium dioxide ($TiO_2$) pigment, based on the total weight of the ink or coating composition;
   c) 0.5 wt % to 6 wt % polymeric void hollowsphere particles, based on the total weight of the ink or coating composition; and
   d) 20 wt % to 60 wt % one or more organic solvents, based on the total weight of the ink or coating composition.

2. The solvent-based white ink or coating composition of claim 1, further comprising $TiO_2$ coated mica pigment; wherein the $TiO_2$ coated mica pigment is present in an amount of 1 wt % to 20 wt %, based on the total weight of the ink or coating composition; and wherein the $TiO_2$ coated mica pigment has a particle size of 1 μm to 15 μm.

3. The solvent-based white ink or coating composition of claim 2, further comprising a $TiO_2$ coated mica pigment that is further coated with tin oxide (SnO).

4. The solvent-based white ink or coating composition of claim 1, further comprising an aluminum pigment; wherein the aluminum pigment is present in an amount of 0.05 wt % to 2 wt %, based on the total weight of the ink or coating composition.

5. The solvent-based white ink or coating composition of claim 1, wherein the binders are each independently selected from the group consisting of nitrocellulose-based resins, polyester-based resins, polyurethane-based resins, acrylic-based resins, polyamide-based resins, polyvinyl butyral-based resins, styrene-based resins, and mixtures thereof.

6. The solvent-based white ink or coating composition of claim 1, wherein the polymeric void hollowsphere particles comprise a styrene-acrylate co-polymer.

7. The solvent-based white ink or coating composition of claim 1, wherein the polymeric void hollowspheres have a hollowsphere morphology with an external diameter of 0.2 μm to 0.5 μm.

8. The solvent-based white ink or coating composition of claim 1, wherein the solvents comprise aliphatic alcohols or ester solvents, or mixtures thereof.

9. The solvent-based white ink or coating composition of claim 1, further comprising one or more additives selected from the group consisting of adhesion promoters, waxes, flow promoters, defoamers, antioxidants, stabilizers, surfactants, dispersants, plasticizers, rheological additives, and silicones; wherein each additive is independently present in an amount of 0.1 wt % to 3 wt %, based on the total weight of the ink or coating composition.

10. The solvent-based white ink or coating composition of claim 1, wherein the ratio of hollowspheres to pigment is 0.01:1 to 0.5:1.

11. The solvent-based white ink or coating composition of claim 1, wherein the ink or coating composition is suitable for printing by flexography or gravure.

12. A method of preparing a printed substrate, comprising:
    a) applying the solvent-based white ink or coating composition of claim 1 on a substrate; and
    b) drying the solvent-based white ink or coating composition on the substrate.

13. The method of claim 12, wherein a single layer of the solvent-based white ink or coating composition is applied; or wherein more than one layer of the solvent-based white ink or coating composition is applied.

14. The method of claim 12, wherein the substrate is a polymeric film.

15. A printed substrate prepared by the method of claim 12.

16. The substrate of claim 15, wherein the ink or coating composition provides a contrast ratio opacity of at least 60% when a single layer of the solvent-based white ink or coating composition is applied; and/or wherein the ink or coating composition provides a contrast ratio opacity of at least 70% when two layers of the solvent-based white ink or coating composition are applied; and/or wherein the ink or coating composition provides a contrast ratio opacity of at least 80% when three or more layers of the solvent-based white ink or coating composition are applied.

17. An article comprising the printed substrate of claim 15.

18. An article comprising the solvent-based white ink or coating composition of claim 1.

* * * * *